(12) United States Patent
Tannous et al.

(10) Patent No.: US 12,143,259 B2
(45) Date of Patent: Nov. 12, 2024

(54) SLOW DRAIN AND CONGESTION SPREADING DETECTION SERVICE

(71) Applicant: Dell Products L.P., Round Rock, TX (US)

(72) Inventors: Massarrah N. Tannous, Cambridge, MA (US); Daniel Mckay, Andover, MA (US); Erik P. Smith, Douglas, MA (US); Jai Bansal, Bangalore (IN); Jean E. Pierre, Brockton, MA (US); Alan Rajapa, Brooklyn, NY (US)

(73) Assignee: Dell Products L.P., Round Rock, TX (US)

( * ) Notice: Subject to any disclaimer, the term of this patent is extended or adjusted under 35 U.S.C. 154(b) by 386 days.

(21) Appl. No.: 17/659,737

(22) Filed: Apr. 19, 2022

(65) Prior Publication Data
US 2023/0336401 A1     Oct. 19, 2023

(51) Int. Cl.
*H04L 41/0631* (2022.01)
*H04L 43/0876* (2022.01)

(52) U.S. Cl.
CPC ...... *H04L 41/0631* (2013.01); *H04L 43/0876* (2013.01)

(58) Field of Classification Search
CPC .................. H04L 41/0631; H04L 43/0876
See application file for complete search history.

(56) References Cited

U.S. PATENT DOCUMENTS

| | | | | |
|---|---|---|---|---|
| 2015/0277803 A1* | 10/2015 | Nakajima | ............. | G06F 3/0632 710/74 |
| 2018/0176154 A1* | 6/2018 | Sigoure | .................. | H04L 49/50 |
| 2021/0004171 A1* | 1/2021 | Li | .......................... | H04L 67/565 |
| 2023/0396549 A1* | 12/2023 | Xiong | ................. | H04L 47/2441 |

* cited by examiner

*Primary Examiner* — Kevin M Cunningham
(74) *Attorney, Agent, or Firm* — Workman Nydegger

(57) ABSTRACT

Techniques for determining an impact that a congested switch port is having on a network and for estimating a reason as to why the congested switch port is congested are disclosed. Configuration data and performance data from a network are obtained. Based on the configuration data, a shortest path between a storage port and a host port is identified. A particular switch port is also identified as a result of that port being congested. An impact as to how the switch port, due to its congestion in the particular shortest path, is impacting or is being impacted by other switch ports in the network is determined. An alert, which includes information indicating the impact, is triggered.

20 Claims, 6 Drawing Sheets

SLOW DRAIN AND CONGESTION SPREADING DETECTION SERVICE

FIELD OF THE INVENTION

Embodiments of the present invention generally relate to identifying an impact that congestion is having on a network and identifying a cause for that congestion. More particularly, at least some embodiments of the invention relate to systems, hardware, software, computer-readable media, and methods for determining an impact that a congested switch port is having on a network and for estimating a reason as to why the congested switch port is congested.

BACKGROUND

A storage area network (SAN) is a type of high-speed network that provides access to a storage layer. A SAN includes any number of host computing devices, any number of storage arrays or servers, and any number of intervening switches that link the storage arrays or servers to the host devices. Traditionally, it was the case that a single host server could connect or attach to only a limited number of storage devices. With the advent of SANs, however, a host can now attach to almost an unlimited number of storage devices, thereby greatly expanding the network's storage capacity and the host's ability to access data. Beneficially, a SAN eliminates the requirement for traditional dedicated connections between hosts and storage devices and further removes single points of failure with regard to storage abilities.

A SAN enables storage services to be accessed via the network, as opposed to being attached to a particular server bus. As a result, the storage services can be externalized and potentially even distributed across different locations. The phrase "Fibre Channel" refers to an in-order, lossless protocol frequently used to access storage services in a SAN, where the protocol is provided to deliver raw block data in a high-speed manner.

Due to the framework or principles used by SANs and Fibre Channel, various techniques can be employed to store, access, or even move data throughout the network. To achieve these benefits, the SAN includes any number of switches, which in turn include any number of ports. An inter-switch link (ISL) refers to a linkage that connects one switch to another switch. An ISL can also be referred to as an E-port to E-port link such that an E-port can be used to cascade Fibre channel switches together. As such, an ISL is created when two E-ports are connected to one another. More generally, a switch port can be said to be an "ISL port" when it is used to create an ISL.

An F-port, on the other hand, is a link between a switch and another device that is not a switch, such as perhaps a host device or a storage node. Consequently, an F-port is used to connect a node to the Fibre channel fabric.

The combination of the various components of the SAN can be referred to as a SAN fabric, or simply just a fabric. As mentioned previously, Fibre Channel (FC) is the protocol that is used to deliver lossless, in-order packets or blocks of data throughout the SAN.

Notably, a host bus adapter (HBA) connects host devices and storage nodes to the various switches of the FC SAN. Furthermore, it may be the case that different ports of a single switch can use or be integrated with different ISLs connecting to different switches.

SAN zoning refers to a fabric-based technique or service that groups host devices, storage nodes, and switches and their ports, into various different logical groupings or zones to better control communication that occurs between different devices. That is, a zone is configured to include various nodes (e.g., storage devices and hosts). The devices within a zone are allowed to communicate with only the other devices that are also included within that same zone. Communication between nodes that do not share a common zone is prohibited.

When a component in the SAN becomes congested (e.g., a reduction in the quality of service that a SAN is able to provide, resulting in delays, packet losses, and blockages of connections), that congestion can have a wide impact on the SAN. Traditionally, there have been various techniques for determining when congestion within a SAN occurs. Although these techniques are quite useful, the traditional congestion-detecting methodologies are quite deficient with regard to identifying a reason or a cause as to why the congestion occurred. What is needed, therefore, is an improved technique for not only identifying congestion but also for determining reasons as to why that congestion occurred.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
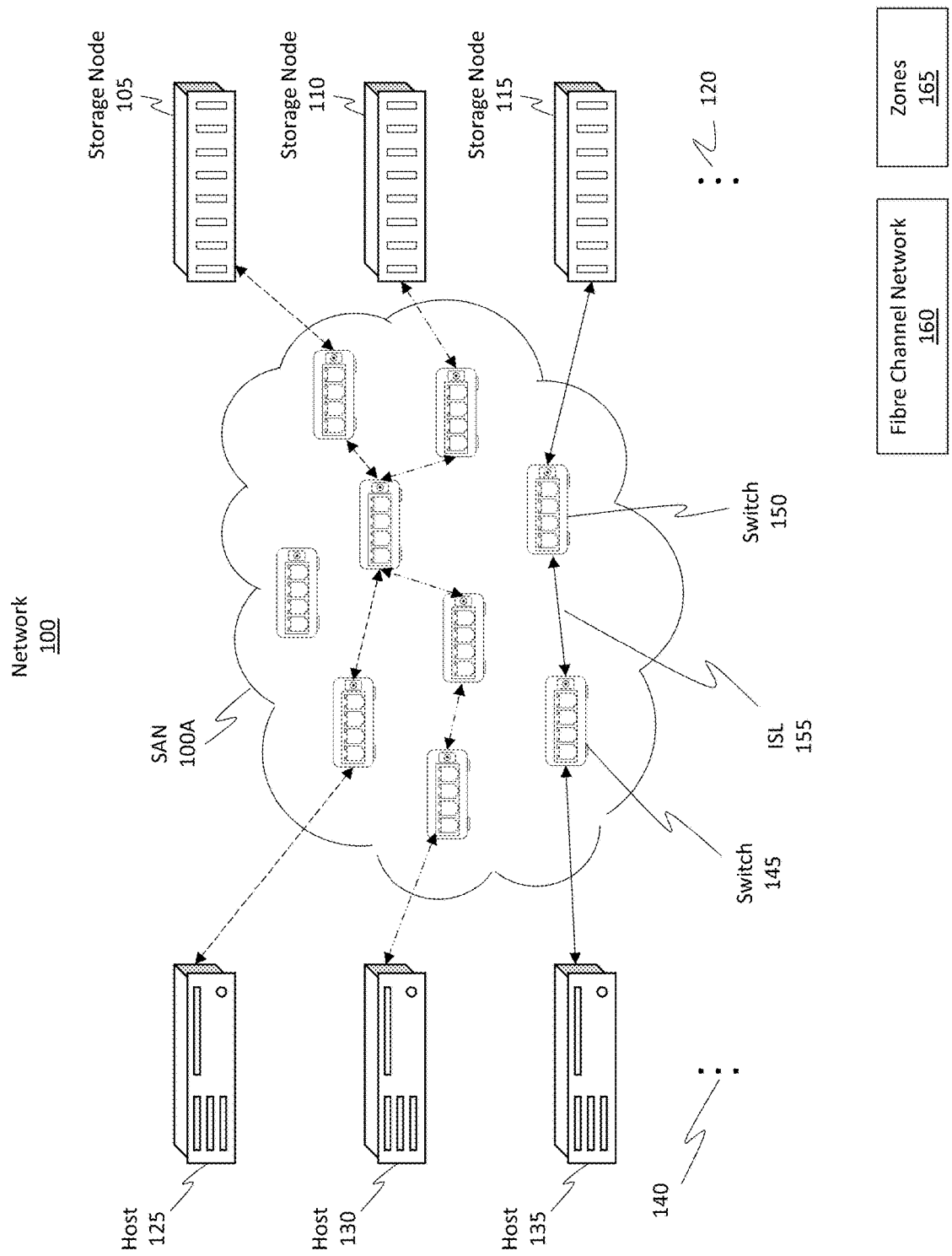
FIG. 1 illustrates an example network that includes host nodes, storage nodes, and various intervening switches in a SAN.

Embodiments disclosed herein relate to systems, devices, and methods for determining an impact that a congested port (e.g., a switch port, a host port, or even a storage port) is having on a network and for estimating a reason as to why the congested switch port is congested.

Some embodiments obtain configuration data and performance data from a network that includes a host port, a storage port, and a plurality of intervening switch ports. Based on the configuration data, the embodiments identify a plurality of paths that a network packet can potentially traverse when traveling between the storage port and the host port. The paths are formed based on inter-switch links (ISLs) between various intervening switch ports (e.g., E-ports). The embodiments identify one or more shortest paths that exist between the storage port and the host port. The shortest paths are identified from among the plurality of paths, and the shortest paths indicate how at least a majority of network packets flow through the network when those network packets travel between the storage port and the host port. The embodiments identify a particular shortest path and identify, from within the particular shortest path, a particular switch port that is identified as a result of that particular switch port being congested. The particular switch port is identified as being congested based on the performance data. The embodiments also determine an impact as to how the particular switch port, due to its congestion in the particular shortest path, is impacting or is being impacted by other ports in the network. Determining the impact includes examining the network upstream of the particular switch port to identify one or more upstream ports that are using a first ISL that is used by the particular switch port or, alternatively, includes examining the network downstream of the particular switch port to identify one or more downstream switch ports that are using a second ISL that is used by the particular switch port. The embodiments also trigger an alert comprising information indicating the impact that the particular switch port is causing on the network.

Optionally, updated configuration data and updated performance data can be periodically obtained. In some cases, the disclosed processes can be repeated in response to the updated configuration data and the updated performance data.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits, advantages, and practical applications to the technical field of data storage and network analysis. Although traditional systems are able to identify when a network becomes congested, those traditional systems are unable to determine granular reasons as to why the congestion occurred. Furthermore, such systems are unable to determine the micro and macro impact that the congestion has on the network.

In contrast to the deficiencies of the traditional technology, the disclosed embodiments are beneficially able to identify granular reasons as to why a network has become congested. Furthermore, the embodiments are able to determine the impact that the congestion has on the network. By performing the disclosed operations, the embodiments can help improve the overall efficiency and computing operations of the network. As a result, the embodiments directly improve the functionality of the network itself. By identifying congestion and reasons pertaining to that congestion, various mitigation operations can be triggered in order to quickly resolve the congestion and restore the network to its optimal conditions. Accordingly, these and numerous other benefits will be discussed in detail throughout the remaining portions of this disclosure.

Example Storage Area Network

Having just described some of the high level benefits provided by the disclosed embodiments, attention will now be directed to FIG. 1, which illustrates an example network 100 in which the disclosed principles can be employed. Notably, the network 100 can include a SAN 100A, and switches that are connected via inter-switch links (ISL) are considered to be in the same SAN. Network 100 is shown as including a storage node 105, a storage node 110, and a storage node 115. The ellipsis 120 represents how any number of storage nodes can be included in the network 100.

The storage nodes 105, 110, and 115 can have any type of storage device, without limit. Examples of storage devices include, but are not limited to, any type of hard disk drive (HDD), solid state drive (SSD), flash memory, optical storage device, tape storage, and so on.

The network 100 also includes a host 125, a host 130, and a host 135. The ellipsis 140 represents how any number of hosts can be included in or can interact with the network 100. A host can be any type of computing device capable of sending or receiving requests for content from the storage nodes. Examples of hosts can include any type of server or perhaps even any type of end client device (e.g., phones, tablets, laptops, desktops, etc.).

The network 100, and in particular the SAN 100A, is further comprised of any number of switches, such as switch 145 and switch 150. As stated previously, switches that are connected to one another via ISLs are included in the same SAN (e.g., SAN 100A). The switches 145 and 150 are computing devices that connect other computing devices together and are dedicated to transporting network traffic (e.g., network packets such as block data). The switches 145 and 150 are high speed devices that physically connect the hosts 125, 130, and 135 to the storage nodes 105, 110, and 115.

An inter-switch link (ISL) 155 is a link that interconnects a switch with another switch. To illustrate, the ISL 155 is shown as connecting switch 145 to switch 150. A switch port that is used to connect a switch to another switch is referred to as an E-port. An ISL, then, is formed from the connection between two E-ports. A port that is used to form an ISL port can also be referred to as an "ISL port." A switch port that is used to connect the switch to a non-switch node is referred to as an F-port. It may be the case that a specific port of a switch utilizes a particular ISL while another port of the switch utilizes a different ISL.

The SAN 100A can be an example of a Fibre channel network 160. The Fibre channel network 160 is a type of network that uses a high-speed protocol to transfer data in a lossless, in-order manner.

The SAN 100A can include any number of zones 165. Zoning refers to a technique for organizing or grouping different portions of the SAN 100A into logical segments. The various segments then control the communications that flow through those zones. When zoning is implemented in the SAN 100A, devices (and perhaps specific ports on devices) will be restricted to communicating with only devices that are also included in the same zone.

Congestion spreading is a common problem in lossless (e.g., Fibre channel) networks, such as the SAN 100A. Congestion spreading typically occurs when a host attempts to read data from a storage node at a rate that is greater than the host can consume. This event can occur when the HBA port is attached to the SAN at a slower speed than the array port the HBA port is sending the read commands to.

As a non-limiting example, consider a scenario where the host HBA port speed is 8 Gb/s and the target array port speed is 16 Gb/s. While in this configuration, if the host transmits read IOs at a rate that would result in more than 8 Gb/s being returned to the host, then the result would be frames (e.g., network packets) being queued in the fabric of the SAN 100A. These queued frames can congest the various ports of the switches and might also start getting built up on any ISLs in the data path.

When this happens, the fabric starts to get congested, and other hosts connected to the same fabric start to experience IO delays. This eventually impacts the IO performance of the other hosts, and the entire fabric may become congested.

Hosts performing IO typically do not know the reason for the congestion in the fabric, but it may be the case that all or a majority of the hosts could start to experience a drop in their respective IO performances. This problem is generally called congestion spreading, and this problem often occurs because of "oversubscription."

Oversubscription refers to a scenario where multiple devices are connected to the same switch port in order to optimize the usage of that switch. When multiple devices are connected to the same port and when congestion occurs on that switch port, then the connected devices might all experience adverse effects from congestion.

Congestion Spreading

Figure 2:
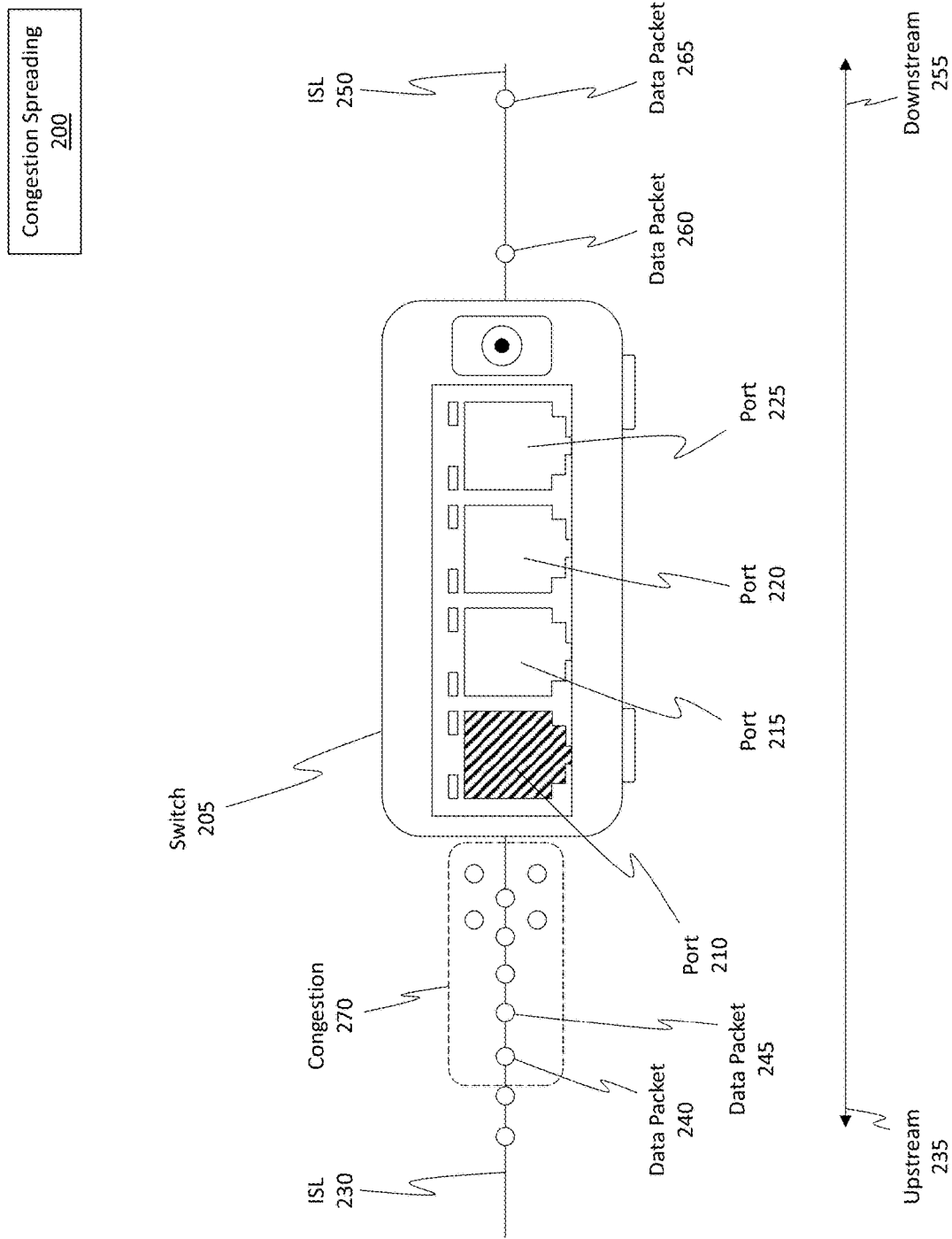
FIG. 2 illustrates various details regarding a SAN switch.

The disclosed embodiments beneficially help detect when congestion in the fabric of the SAN 100A occurs and also beneficially determine a reason or cause for that congestion. As will be described in more detail shortly, the embodiments acquire telemetry data from the various switches. The embodiments then analyze that data as well as the fabric to detect if congestion spreading is occurring. The embodiments further determine the scope or impact of that congestion spreading as well as the reason why it occurred. The embodiments are also able to trigger alerts that include information describing the impact and the reasons. FIG. 2 provides a helpful illustration regarding congestion spreading 200.

FIG. 2 shows a switch 205, which is representative of any of the switches shown in FIG. 1. Switch 205 is shown as including a port 210, a port 215, a port 220, and a port 225. A switch port is a physical opening into which a cable can be plugged in order to link the switch to other computing devices. Once a device is connected to a switch via a port, that device can communicate in parallel with any other devices that are connected to the switch.

FIG. 2 also shows a ISL 230, which is located upstream 235 (in the scenario where the port 210 receives data from another device) of the switch 205. The port 210 is illustrated with the diagonal shading to emphasize how the port 210 is currently utilizing the ISL 230 to transmit (e.g., send or receive) data packets (e.g., data packets 240 and 245) from another device. Thus, the port 210 is an E-port (aka an ISL port).

The switch 205 is also utilizing an ISL 250, which is located downstream 255 (in the scenario where the switch 205 is sending data to another device) of the switch 205. The switch 205 is currently utilizing ISL 250 to transmit (e.g., send or receive) data packets (e.g., data packets 260 and 265) to another device. Ports 215, 220, or 225 might be the E-port for the ISL 250.

Notice, the spacing between the data packets upstream of the switch 205 versus the spacing between the data packets downstream of the switch 205. This spacing generally represents the rates of transmission for the different packets. A larger space represents slower transmissions while a smaller space represents higher transmissions. The data packets upstream of the port 210 are being received at a faster rate than the data packets that are being sent downstream. Such a scenario indicates that congestion 270 is occurring on the switch 205, and particularly on the port 210. As mentioned previously, congestion spreading can negatively impact the SAN.

The determination of whether congestion is occurring is based on data that is acquired from the network, such as from the various switches in the network. That is, in accordance with the disclosed principles, the embodiments acquire telemetry data from the switches in the SAN, as represented by telemetry data 300 of FIG. 3.

The telemetry data 300 includes configuration data 305 and performance data 310. The telemetry data 300 can be acquired from the switches in the network based on a predefined frequency or period. In some cases, the period can be selected as being anywhere from 5 minutes to 15 minutes. That is, updated telemetry data 300 can be acquired every 5 minutes to 15 minutes. In some exceptional cases, updated telemetry data can be acquired more frequently, such as perhaps between every 1 minute to every 4 minutes. Similarly, in some exceptional cases, updated telemetry data can be acquired less frequently, such as periods that are longer than 15 minutes.

The configuration data 305 includes information describing the topology 315 and configuration of the SAN. As some examples, the configuration data 305 can include information describing the fabric configuration of the SAN, the various switch port types and configurations of the switches, what end devices (e.g., hosts and storage nodes) are included in the SAN, what switches are attached to the SAN, information about the various zones in the SAN, and so on without limit. In this regard, the configuration data 305 includes various information describing the hardware and software configurations of the SAN.

The performance data 310 describes the utilization and operations of the various devices in the SAN. As some examples, the performance data 310 can include information describing the port utilization of the switches, the presence or absence of errors (e.g., class 3 discards, CRC errors, IO encoding errors), link resets, and so on. From this information, the embodiments can determine a so-called "congestion ratio."

A "congestion ratio" for a specific port is computed by dividing a counter reflecting an amount of time the port spends at a 0 transmit credit level by a counter reflecting the number of frames that are transmitted. By way of further explanation, a port is typically provided or is issued a certain number of "credits" that are associated with the size and the number of frames that the port is permitted to send. The port's credits are decremented when a particular frame is sent. The port's credits are incremented when that particular frame reaches a prescribed destination. An example will be helpful.

Suppose a port is issued 10 credits. When the port sends a first frame, the credit value is decremented to a value of 9. When the frame reaches the other end of the link and is forwarded onto its destination, a signal is sent back to the port that transmitted the frame and the credit value is incremented back to 10. Now suppose the port sends 5 frames. Prior to those frames reaching the other end of the link and being forwarded to their destinations, the credit value of the port is decremented to a value of 5. Suppose 4 of the frames reach the other end of the link and are forwarded to their destinations but, due to data corruption (e.g., perhaps a bit error), the fifth frame does not reach the other end of the link intact or perhaps the fifth frame does reach its destination but the data corruption resulted in the port not being able to increment its credit value. The resulting credit value of the port is now 9.

Now, suppose over time the port repeatedly lost or leaked credits. In this example scenario (due to credit leaking), the port might eventually hover between a credit value of 0 and 1, without returning to a credit level of 10. With such a low credit value, the port is being seriously underutilized, and it will likely be the case that the port is experiencing congestion because the congestion ratio for this port, which is computed by dividing a counter reflecting an amount of time the port spends at a 0 transmit credit level by a counter reflecting the number of frames that are transmitted, is above a particular threshold. The above example describes a so-called "slow drain" scenario in which a device is not accepting frames at a rate where those frames were generated by a source.

In some example scenarios, the threshold can be set to a value of 0.2. Congestion ratios equal to or above a value of 0.2 can indicate that the port is congested. Congestion ratios below the 0.2 threshold can indicate that the port is not congested. Of course, other specific values can be used as the threshold. Accordingly, the embodiments are able to identify congestion by acquiring telemetry data and by analyzing the performance of a port based on that port's congestion ratio.

To determine the impact and the source of congestion, the embodiments are further configured to use the configuration data 305 to perform a number of other operations.

Figure 4:
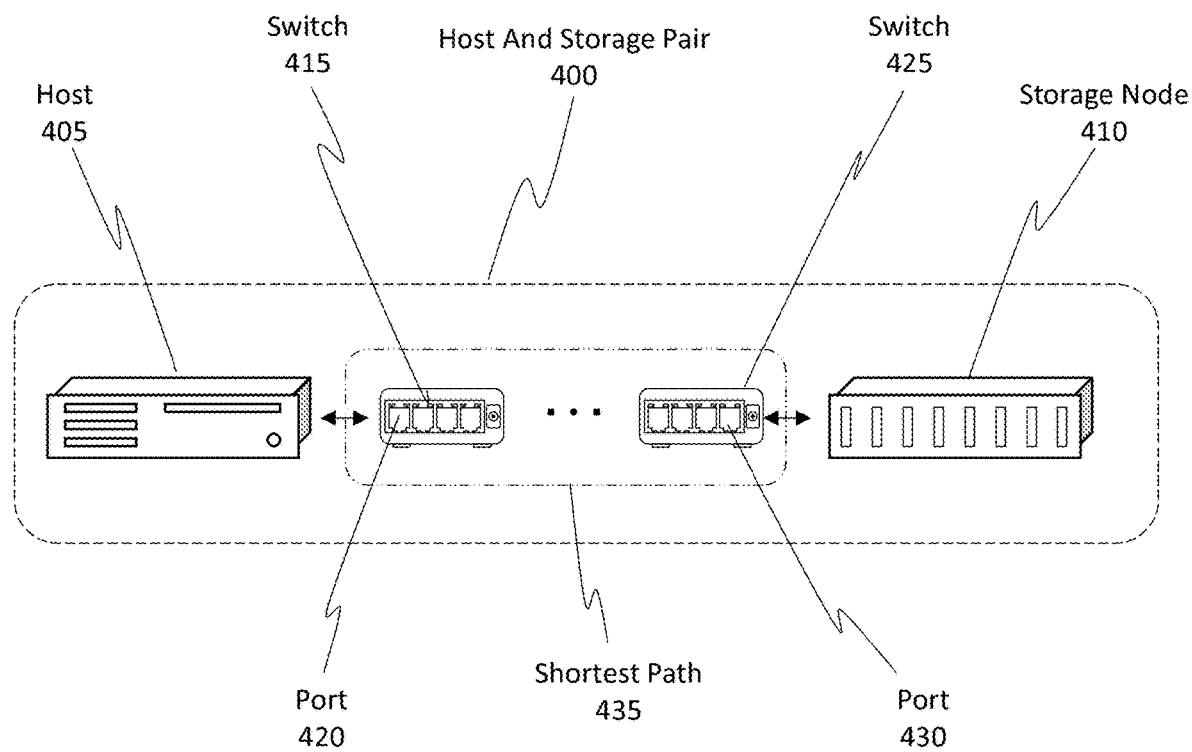
FIG. 4 illustrates a host and storage pair as well as a shortest path that exists between the host and the storage node.

To determine the impact and cause of slow drain and congestion spreading, it is beneficial to first know all of the host and storage node combinations (i.e. which host devices talk with which storage nodes). FIG. 4 is illustrative.

FIG. 4 shows one example host and storage pair 400, where a particular host 405 communicates with a particular storage node 410. The embodiments are able to identify all such pairings of hosts and storage nodes in the SAN. One will appreciate how the pairings are at least partially influenced based on the zones included in the SAN.

A frame (aka a network packet) can potentially take various different pathways when traveling between the storage node 410 and the host 405. A "pathway" generally refers to a set of one or more switches and the linkages or ISLs between those switches that are used by a frame when the frame travels between the storage node 410 and the host 405. With reference to FIG. 1, one particular pathway between the host 135 and the storage node 115 includes the switch 145 and the switch 150. One will appreciate how any number of pathways can potentially exist between a host and a storage node in a SAN. The pathway information not only identifies which switches are used but also identifies which particular ports in the switches are used.

In accordance with the disclosed principles, the embodiments are configured to identify the shortest path that exists between a host and a storage node. The "shortest" path refers to a pathway that exists between a host and a storage node and that requires or uses the fewest number of intervening switches to transmit a frame. The shortest path may be calculated using Dijkstra's algorithm. Notably, it may be the case that multiple pathways between a host and a storage node can qualify as being a shortest path. Thus, the shortest path can include one or more different pathways through the SAN.

FIG. 4 shows a switch 415, which includes a specific port 420, and a switch 425, which includes a specific port 430. The ellipsis shown in the middle is provided to illustrate how the network can be of any size.

The embodiments can optionally use Dijkstra's algorithm to compute the shortest path 435 that exists between the host 405 and the storage node 410. The shortest path 435 is the path that will likely be used be all, or at least a majority, of frames that are transmitted between the host 405 and the storage node 410. In some cases, a cloud service can be used, where this service is an event based microservice that runs as a part of the cloud to optionally execute Dijkstra's algorithm.

Figure 3:
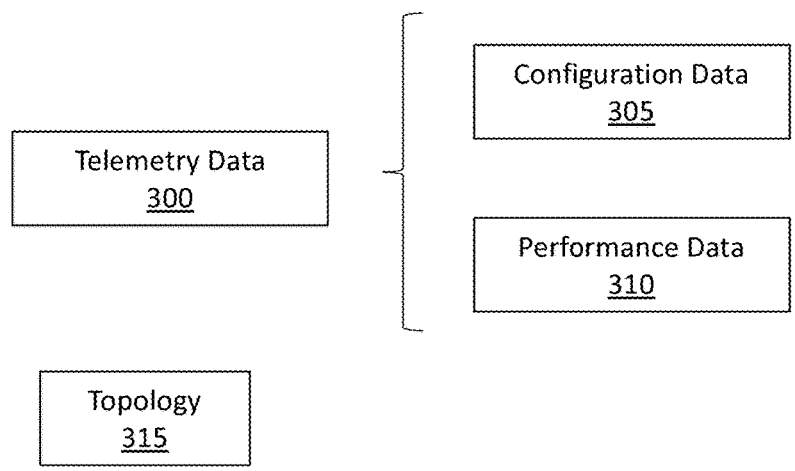
FIG. 3 illustrates examples of telemetry data that can be collected from the switches in the SAN.

Accordingly, the embodiments are able to use the configuration data 305 from FIG. 3 to determine the various pathways that exists between host and storage pairs. Additionally, the embodiments are able to determine which of those pathways are the "shortest" pathways. Using the performance data 310, the embodiments are able to determine which specific ports in a switch are considered to be "congested."

Figure 5:
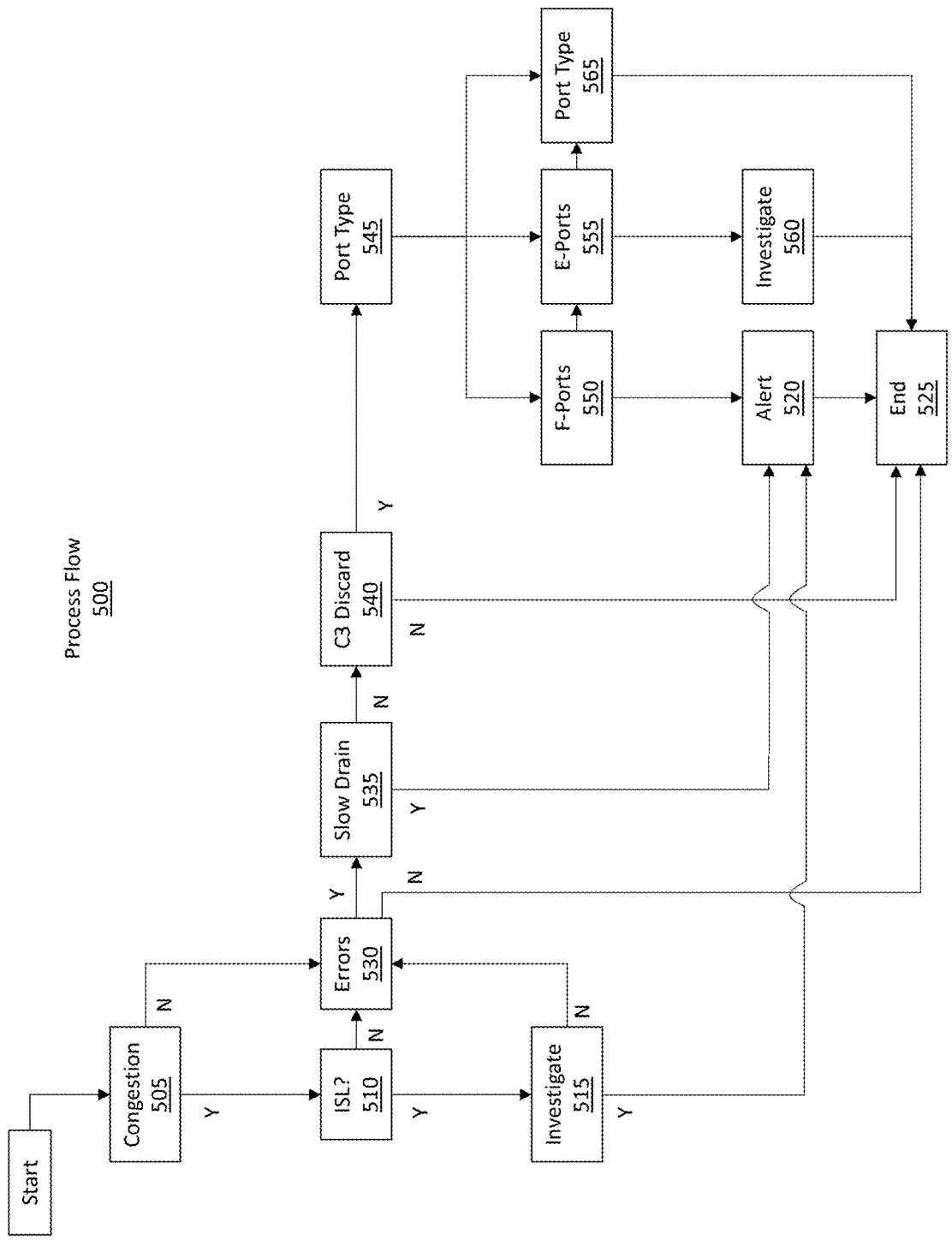
FIG. 5 illustrates a process for identifying causes of congestion in a network.

FIG. 5 illustrates an example process flow 500 that can be used to investigate a reason as to why a port is congested. That is, the process flow 500 is performed in an attempt to detect or to troubleshoot performance problems in a SAN. That is, the process flow 500 can be performed for each specific port that is suspected of being congested and can be performed in an attempt to determine if congestion is causing the performance problem.

To troubleshoot the detection, the first step 505 is to determine (e.g., using the techniques mentioned previously) whether any ports are suspected of being congested. In some instances, it might be the case that there is uncertainty as to whether a port is actually congested or whether the port is experiencing some other issue causing slow down.

Using the techniques mentioned previously (e.g., by computing the congestion ratio), the embodiments determine whether congestion has occurred.

If congestion has occurred, the process flow proceeds to step 510, which includes determining whether the port is considered an ISL port (aka an E-port). As described previously, an ISL port is a port that is connected to a port of another switch as opposed to being connected to a non-switch node.

If the port is an ISL port, then the process flow proceeds to step 515, which is an investigative step that includes looking at each connected switch (i.e. each switch providing the E-port) individually. Additionally, or alternatively, the investigation includes looking at all the interfaces running above a threshold level (e.g., perhaps greater than or equal to 95%). The overutilization of a port can be the reason for the congestion.

If the utilization is above the threshold, then an alert is issued, as shown by step 520, to indicate that the source of the problem is the utilization of the switch. The process can then end, as shown by step 525.

On the other hand, if congestion has not occurred (as determined in step 505) but there is still a suspicion that the network is having issues, then the process flow proceeds to step 530. Step 530 is also triggered if the determination of step 510 is that the port is not an ISL port (e.g., perhaps the port is an F-port). Similarly, step 530 is also triggered if the determination of step 515 is that the utilization of the port is not above the threshold.

Step 530 incudes investigating to determine whether the port is associated with various errors, such as by looking for in-CRC errors, IO errors, or perhaps a link reset. The embodiments can inquire about any other errors as well. If there are no errors, then the process can end 525. If there are errors, then step 535 can be performed.

During step 535, the embodiments determine whether any identified errors are indicative of slow drain. As mentioned previously, slow drain refers to a scenario where a device is not accepting frames at a rate where those frames were generated by a source.

If so, then the process flow will again trigger an alert, as shown by step 520 to inform a user to look at the port currently being inspected because it is likely that this port is causing slow drain. For instance, the switch might be leaking credits, thereby resulting in a slow drain scenario.

If, on the other hand, the errors are not reflective of slow drain, then the process flow 500 proceeds to step 540. Step 540 includes determining whether any ports are associated with C3 discards. C3 discards (aka "discard class 3 errors" or "class 3 discard errors") are switch errors that can be generated when a device sends frames to the switch without performing a fabric login (e.g., "FLOGI") or without appending a valid destination to the frame. C3 discards can also be generated when a frame is held in a buffer for an extended period of time, such as because it cannot be transmitted (e.g., due to a lack of a credit). When the length of time the frame is held exceeds the "hold timer" (e.g., about 200 ms), then the frame is discarded, and the C3 discard counter is incremented. C3 discards are an indication of the most severe type of congestion and usually only happens when device is slow draining. Congestion spreading due to oversubscription does not typically result in C3 discards.

If no ports are associated with C3 discards, then there is no severe congestion (congestion may still be present, but it will not be severe), and the process flow 500 can end in step 525. If ports are associated with C3 discards, then the process flow 500 can proceed to step 545 to examine what type the suspicious ports are.

If step 545 determines the ports are F-ports, the process flow 500 proceeds to step 550. If the ports are F-ports, then the embodiments trigger an alert (step 520) to inform a user to look specifically at those F-ports. The process flow 500 then ends in step 525.

If step 545 determines the ports are E-ports, the process flow 500 proceeds to step 555, then the process flow 500 includes performing an investigative step 560 to investigate the E-ports for oversubscription problems. Subsequently, the process flow 500 ends in step 525.

If step 545 determines that the ports are not F-ports or E-ports, then the process flow 500 proceeds to step 565, which includes determining the port type. The embodiments investigate this port with further support from an administrator, and then the process flow 500 ends in step 525. Accordingly, the embodiments are able to perform various investigative operations to identify a source of a port problem.

The embodiments are further able to determine which other network components may be impacted by the congestion. For instance, the embodiments can investigate both upstream and downstream of a port to identify which switches, ports, or other entities are being impacted by a particular port's congestion. When alerts are sent to a user/administrator, the alerts can include information describing the nature, scope, or impact that the congestion is having as well as the likely source of the congestion.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
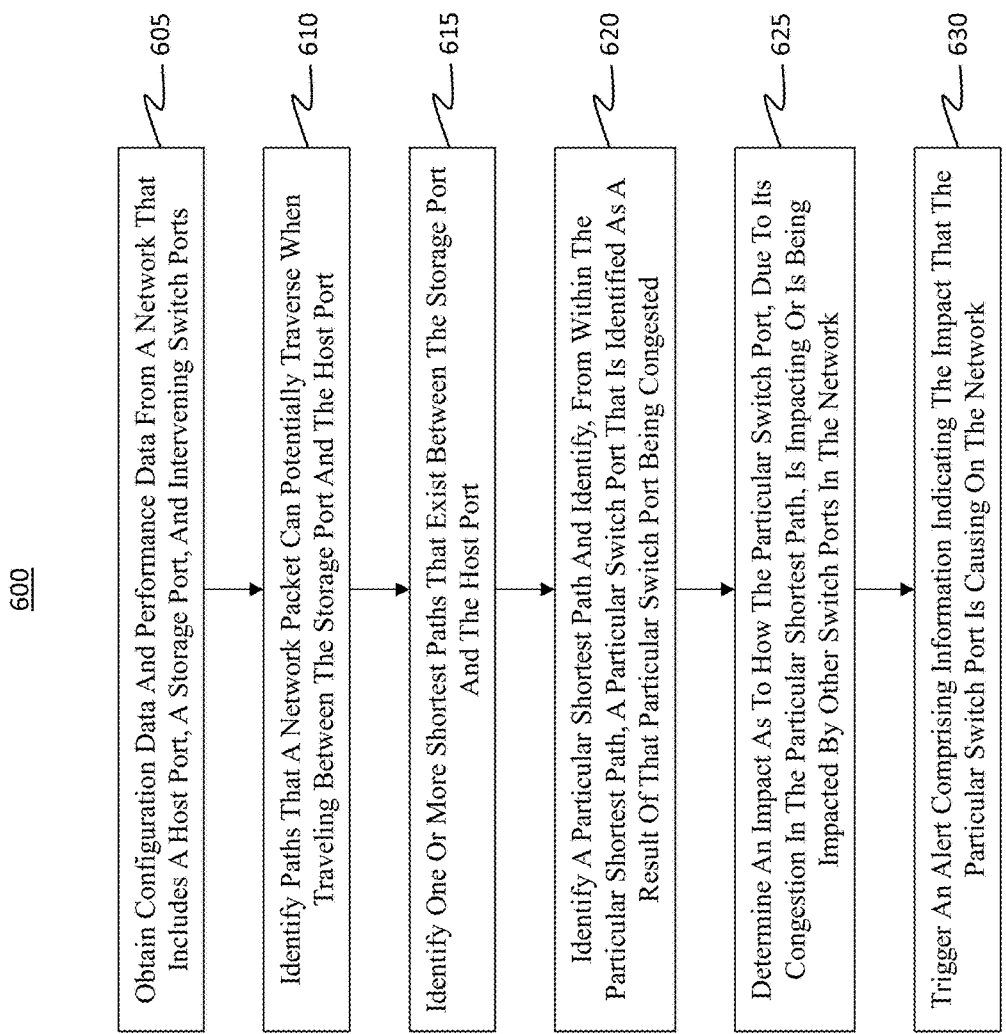
FIG. 6 illustrates a flow chart of an example method for determining an impact that a congested switch port is having on a network and for estimating a reason as to why the congested switch port is congested.

Attention will now be directed to FIG. 6, which illustrates a flowchart of an example method 600 for determining an impact that a congested switch port is having on a network and for estimating a reason as to why the congested switch port is congested. Method 600 can be implemented in the network 100, and in particular the SAN 100A of FIG. 1.

Initially, method 600 includes an act (act 605) of obtaining configuration data and performance data from a network. The combination of this data is referred to as telemetry data. The telemetry data can be obtained from the various switches in the network, which includes a host port, a storage port, and a plurality of intervening switches and switch ports. In some cases, the embodiments periodically obtain updated configuration data and updated performance data.

In some cases, the configuration data includes fabric configuration data, switchport types and configurations, or even zoning configuration data. In some cases, the performance information includes port utilization data, class 3 discard data or errors, cyclic redundancy check (CRC) error data, or input/output (IO) encoding error data.

Based on the configuration data, act 610 includes identifying a plurality of paths that a network packet can potentially traverse when traveling between the storage port and the host port. The plurality of paths are formed based on inter-switch links (ISLs) between various intervening switch ports included in the plurality of intervening switch ports.

In some cases, host and storage combinations are determined prior to identifying the paths. Optionally, each host and storage combination can indicate a particular host port and a particular storage port that communicate with one another. Paths can then be identified for these host and storage combinations.

Act 615 includes identifying one or more shortest paths that exist between the storage port and the host port. The one or more shortest paths are identified from among the plurality of paths and can be identified or optionally calculated using Dijkstra's algorithm. Furthermore, the one or more shortest paths indicate how at least a majority of network packets flow through the network when those network packets travel between the storage port and the host port.

Act 620 includes identifying a particular shortest path from among the one or more shortest paths and identifying, from within the particular shortest path, a particular switch port. This particular switch port is identified as a result of that particular switch port being congested. The particular switch port is identified as being congested based on the performance data that was acquired previously.

As an example, the process of determining that the particular switch port is congested can be based on a congestion ratio exceeding a predetermined threshold. As mentioned previously, the congestion ratio is computed by dividing a counter reflecting an amount of time the particular switch port spends at a 0 transmit credit level by a counter reflecting the number of frames that are transmitted.

In some cases, the switch port is congested due to reasons pertaining to oversubscription. That is, multiple devices may be configured to use the same port, and this port has been overutilized, thereby resulting in congestion.

In some cases, the performance data indicates that the particular switch port is being underutilized (e.g., perhaps a slow drain scenario due to leaking credits). In some cases, the performance data may indicate that the particular switch port is being overutilized (e.g., perhaps an oversubscription scenario).

Act 625 includes determining an impact as to how the particular switch port, due to its congestion in the particular shortest path, is impacting or is being impacted by other switch ports in the network. The process of determining the impact includes examining the network upstream of the particular switch port to identify one or more upstream switch ports that are using a first ISL that is used by the particular switch port. The process can alternatively include examining the network downstream of the particular switch port to identify one or more downstream switch ports that are using a second ISL that is used by the particular switch port.

In some cases, the port might not be an ISL port but rather might be an F-port. In such scenarios, the embodiments can examine that linkage to determine whether it is a problem.

The process of determining the impact can include identifying what sources of data (e.g., perhaps the storage nodes or perhaps the hosts) are being impacted by the particular switch port being congested. Identifying the impact can include a determination as to whether the congestion is impacting multiple other hosts, storage nodes, or switches. The specific identification of these hosts, storage nodes, and switches can be determined. The reason why the congestion occurred can also be determined, such as by examining the error data. By examining the error data, the embodiments can infer or deduce why the congestion is occurring.

Act 630 includes triggering an alert. This alert includes information indicating the impact that the particular switch port is causing on the network. The alert can be sent to an administrator. Various mitigation operations can also be performed in an attempt to address the congestion problem. As an example, a switch can be reset to return its credit values to an initial default value. In some cases, network packets can be rerouted through the network of switches to avoid using congested switches. If multiple storage nodes store redundant versions of data, a host can be instructed to communicate with a different storage node to access data so as to avoid congested switches.

As mentioned previously, updated configuration data and updated performance data can be periodically obtained. Method 600 can, therefore, be repeated in response to the updated configuration data and the updated performance data. In some cases, a period for when method 600 is repeated can be between 5 minutes and 15 minutes.

Existing approaches to detecting congestion provide only very limited information to users, such as which ports are congested. These traditional approaches fail to provide the underlying causes to the congestion. In accordance with the disclosed principles, the embodiments are able to detect what might be causing the congestion. If slow drain or congestion spreading are detected, then the embodiments can also send a health issue to the customer, such as perhaps using a cloud service (e.g., perhaps CloudIQ).

That is, after the embodiments detect that there is slow drain or congestion spreading, the embodiments can notify a customer or an administrator with a CloudIQ health issue. This health issue can be configured to include a specific message on where exactly the slow drain or congestion spreading issues were detected so that the customer knows where to look to remediate the issue as well as the hosts that could be potentially impacted by this congestion as optionally calculated using Dijkstra's algorithm. In this manner, the disclosed embodiments bring about numerous and substantial benefits over the traditional techniques.

Example Architectures and Computer Systems

The following is a discussion of aspects of example operating environments for various embodiments of the invention. This discussion is not intended to limit the scope of the invention, or the applicability of the embodiments, in any way. One will appreciate how the disclosed operations can be performed using these operating environments.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term "data" or "network packet" is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 7:
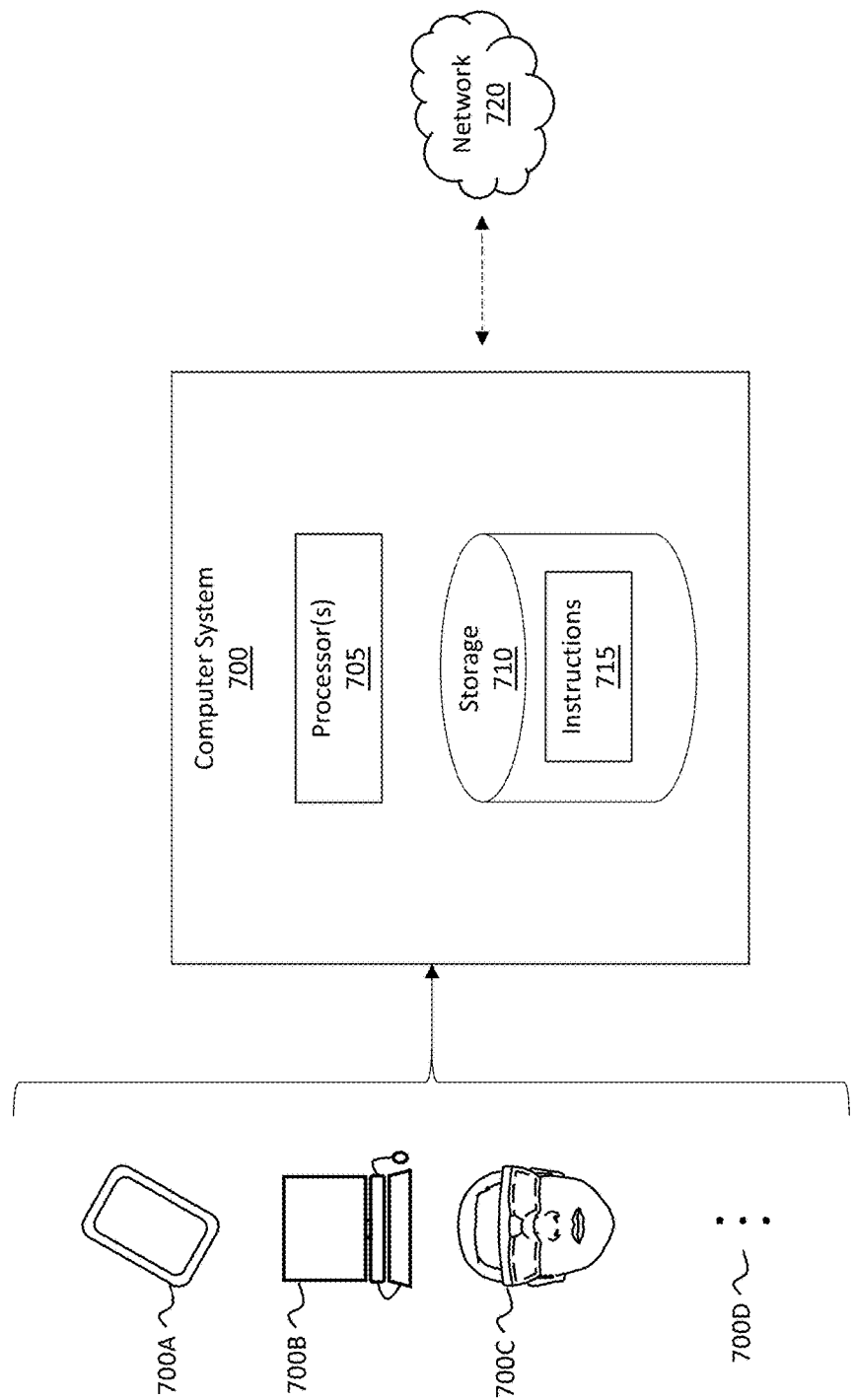
FIG. 7 illustrates an example computer system configured to perform any of the disclosed operations.

With particular attention now to FIG. 7, one example of a computer system 700 is disclosed. Computer system 700 may include and/or be used to perform any of the operations described herein, including method 600 of FIG. 6. Computer system 700 may take various different forms. For example, computer system 700 may be embodied as a tablet 700A, a desktop or a laptop 700B, a wearable device 700C, a mobile device, or any other standalone device, as represented by the ellipsis 700D. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit") and storage 710.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 700. The different components, modules, engines, and services described herein may be implemented as objects or processors that execute on computer system 700 (e.g. as separate threads).

Storage 710 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 710 is shown as including executable instructions 715. The executable instructions 715 represent instructions that are executable by the processor(s) 705 of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices or cloud services to obtain or process data. In some cases, network 720 may itself be a cloud network. Furthermore, computer system 700 may also be connected through one or more wired or wireless networks to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining an impact that a congested port is having on a network and for estimating a reason as to why the congested port is congested, said method comprising:
obtaining configuration data and performance data from a network that includes a host port, a storage port, and a plurality of intervening switch ports;
based on the configuration data, identifying a plurality of paths that a network packet can potentially traverse when traveling between the storage port and the host port, wherein the plurality of paths are formed based on inter-switch links (ISLs) between various intervening switch ports included in the plurality of intervening switch ports;
identifying one or more shortest paths that exist between the storage port and the host port, wherein the one or more shortest paths are identified from among the plurality of paths, and wherein the one or more shortest paths indicate how at least a majority of network packets flow through the network when those network packets travel between the storage port and the host port;
identifying a particular shortest path from among the one or more shortest paths and identifying, from within the particular shortest path, a particular switch port that is identified as a result of that particular switch port being congested, wherein the particular switch port is identified as being congested based on the performance data;
determining an impact as to how the particular switch port, due to its congestion in the particular shortest path, is impacting or is being impacted by other switch ports in the network, wherein determining the impact includes examining the network upstream of the particular switch port to identify one or more upstream switch ports that are using a first ISL that is used by the particular switch port or, alternatively, includes examining the network downstream of the particular switch port to identify one or more downstream switch ports that are using a second ISL that is used by the particular switch port; and
triggering an alert comprising information indicating the impact that the particular switch port is causing on the network.

2. The method of claim 1, wherein the configuration data includes fabric configuration data.

3. The method of claim 1, wherein the configuration data includes switchport types and configurations.

4. The method of claim 1, wherein the configuration data includes zoning configuration data.

5. The method of claim 1, wherein the one or more shortest paths are calculated using Dijkstra's algorithm.

6. The method of claim 1, wherein the performance data includes port utilization data.

7. The method of claim 1, wherein the performance data includes class 3 discard data.

8. The method of claim 1, wherein the performance data includes cyclic redundancy check (CRC) error data.

9. The method of claim 1, wherein the performance data includes input/output (IO) encoding error data.

10. The method of claim 1, wherein determining that the particular switch port is congested is based on a congestion ratio exceeding a predetermined threshold, wherein the congestion ratio is computed by dividing a counter reflecting an amount of time the particular switch port spends at a 0 transmit credit level by a counter reflecting a number of frames that are transmitted.

11. One or more hardware storage devices that store instructions that are executable by a processor of a computer system to cause the computer system to determine an impact that a congested port is having on a network and to estimate a reason as to why the congested port is congested, wherein execution of the instructions causes the computer system to:
- obtain configuration data and performance data from a network that includes a host port, a storage port, and a plurality of intervening switch ports;
- based on the configuration data, identify a plurality of paths that a network packet can potentially traverse when traveling between the storage port and the host port, wherein the plurality of paths are formed based on inter-switch links (ISLs) between various intervening switch ports included in the plurality of intervening switch ports;
- identify one or more shortest paths that exist between the storage port and the host port, wherein the one or more shortest paths are identified from among the plurality of paths, and wherein the one or more shortest paths indicate how at least a majority of network packets flow through the network when those network packets travel between the storage port and the host port;
- identify a particular shortest path from among the one or more shortest paths and identifying, from within the particular shortest path, a particular switch port that is identified as a result of that particular switch port being congested, wherein the particular switch port is identified as being congested based on the performance data;
- determine an impact as to how the particular switch port, due to its congestion in the particular shortest path, is impacting or is being impacted by other switch ports in the network, wherein determining the impact includes examining the network upstream of the particular switch port to identify one or more upstream switch ports that are using a first ISL that is used by the particular switch port or, alternatively, includes examining the network downstream of the particular switch port to identify one or more downstream switch ports that are using a second ISL that is used by the particular switch port; and
- trigger an alert comprising information indicating the impact that the particular switch port is causing on the network.

12. The one or more hardware storage devices of claim 11, wherein determining the impact includes identifying what sources of data are being impacted by the particular switch port being congested.

13. The one or more hardware storage devices of claim 11, wherein the configuration data is obtained from the plurality of intervening switch ports.

14. The one or more hardware storage devices of claim 11, wherein the particular switch port is congested due to oversubscription.

15. The one or more hardware storage devices of claim 11, wherein execution of the instructions causes the computer system to:
- determine host and storage combinations, wherein each host and storage combination in the host and storage combinations indicates a particular host port and a particular storage port that communicate with one another.

16. The one or more hardware storage devices of claim 11, wherein execution of the instructions further causes the computer system to:
- periodically obtain updated configuration data and updated performance data.

17. A method for determining an impact that a congested port is having on a network and for estimating a reason as to why the congested port is congested, said method comprising:
- obtaining configuration data and performance data from a network that includes a host port, a storage port, and a plurality of intervening switch ports;
- based on the configuration data, identifying a plurality of paths that a network packet can potentially traverse when traveling between the storage port and the host port, wherein the plurality of paths are formed based on inter-switch links (ISLs) between various intervening switch ports included in the plurality of intervening switch ports;
- identifying one or more shortest paths that exist between the storage port and the host port, wherein the one or more shortest paths are identified from among the plurality of paths, and wherein the one or more shortest paths indicate how at least a majority of network packets flow through the network when those network packets travel between the storage port and the host port;
- identifying a particular shortest path from among the one or more shortest paths and identifying, from within the particular shortest path, a particular switch port that is identified as a result of that particular switch port being congested, wherein the particular switch port is identified as being congested based on the performance data;
- determining an impact as to how the particular switch port, due to its congestion in the particular shortest path, is impacting or is being impacted by other switch ports in the network, wherein determining the impact includes examining the network upstream of the particular switch port to identify one or more upstream switch ports that are using a first ISL that is used by the particular switch port or, alternatively, includes examining the network downstream of the particular switch port to identify one or more downstream switch ports that are using a second ISL that is used by the particular switch port; and
- triggering an alert comprising information indicating the impact that the particular switch port is causing on the network,
- wherein updated configuration data and updated performance data are periodically obtained, and wherein said method is repeated in response to the updated configuration data and the updated performance data.

18. The method of claim 17, wherein a period for when the method is repeated is between 5 minutes and 15 minutes.

19. The method of claim 17, wherein the performance data indicates that the particular switch port is being underutilized.

20. The method of claim 17, wherein the performance data indicates that the particular switch port is being overutilized.

* * * * *